US005611843A

United States Patent [19]
Ho

[11] Patent Number: 5,611,843
[45] Date of Patent: Mar. 18, 1997

[54] MEMBRANES COMPRISING SALTS OF AMINOACIDS IN HYDROPHILIC POLYMERS

[75] Inventor: W. S. Winston Ho, Annandale, N.J.

[73] Assignee: Exxon Research and Engineering Company, Florham Park, N.J.

[21] Appl. No.: 499,267

[22] Filed: Jul. 7, 1995

[51] Int. Cl.⁶ .......................... B01D 53/22; B01D 71/28
[52] U.S. Cl. .......................... 95/51; 96/13; 96/14; 525/61
[58] Field of Search .............................. 95/51; 96/11–14; 524/395; 525/61, 371

[56] References Cited

U.S. PATENT DOCUMENTS

| | | | |
|---|---|---|---|
| 3,507,840 | 4/1970 | Hurlock | 525/61 X |
| 3,840,482 | 10/1974 | Bolto et al. | 525/61 X |
| 4,419,490 | 12/1983 | Bayer et al. | 525/61 |
| 4,561,864 | 12/1985 | Klass et al. | 95/51 X |
| 4,609,468 | 9/1986 | Cramm | 96/13 X |
| 4,705,545 | 11/1987 | Polak et al. | 96/14 |
| 4,714,482 | 12/1987 | Polak et al. | 96/14 X |
| 5,015,268 | 5/1991 | Ho | 96/14 X |
| 5,041,225 | 8/1991 | Norman | 96/12 X |
| 5,096,468 | 3/1992 | Minhas | 95/51 |
| 5,348,569 | 9/1994 | Bikson et al. | 95/51 X |
| 5,364,454 | 11/1994 | Bikson et al. | 96/13 X |
| 5,409,525 | 4/1995 | Kazama et al. | 95/51 X |
| 5,445,669 | 8/1995 | Nakabayashi et al. | 95/51 X |

FOREIGN PATENT DOCUMENTS

| | | | |
|---|---|---|---|
| 62-241551 | 10/1987 | Japan | 96/14 |
| 02-002859 | 1/1990 | Japan | 96/13 |

OTHER PUBLICATIONS

D.L. Ellig et al., "Concentration of Methane from Mixtures with Carbon Dioxide by Permeation Through Polymeric Films", *J. Membr. Sci*, No. 2, Apr. 1980, 259–263.

Primary Examiner—Robert Spitzer
Attorney, Agent, or Firm—Joseph J. Dvorak

[57] ABSTRACT

The present invention is directed toward a composition suitable for use in separating $CO_2$ from gas streams containing $CO_2$ especially $H_2$ rich gas streams containing $CO_2$ and CO. The composition comprises a hydrophylic polymer and at least one salt of an aminoacid, the salt of the aminoacid being present in an amount ranging from about 10 to about 80 wt % based on the total weight of the composition.

11 Claims, No Drawings

MEMBRANES COMPRISING SALTS OF AMINOACIDS IN HYDROPHILIC POLYMERS

FIELD OF THE INVENTION

The present invention relates to polymer compositions particularly suitable for forming membranes that are useful in separating $CO_2$ from gaseous streams, particularly from gas streams containing $H_2$, $CO_2$ and CO.

BACKGROUND OF THE INVENTION

There are numerous industrial processes in which gas streams are produced containing $CO_2$ as one of the components of the gas stream and in which it is desirable to selectively remove the $CO_2$ from the other components. One technique used to selectively remove $CO_2$ from process gas streams is to absorb the $CO_2$ in an amine solution. Another technique used is to adsorb the $CO_2$ on a molecular sieve.

The use of membranes to separate components in a process stream has long been pursued by the scientific and industrial community. Nonetheless, there remains a need for a membrane that has a high $CO_2$ permeability and selectivity.

It is an object of the present invention to provide novel polymer compositions that are suitable in formation of membranes useful in separating $CO_2$ from process gases, particularly from a $H_2$ rich gas stream containing $CO_2$ and CO.

SUMMARY OF THE INVENTION

In its simplest sense, the present invention is directed toward a composition comprising a hydrophylic polymer and at least one salt of an aminoacid, the salt of the aminoacid being present in amount ranging from about 10 to about 80 wt % based on the total weight of the composition.

Another embodiment of the present invention comprises a membrane suitable for use in separating $CO_2$ from gas streams containing $CO_2$, especially $H_2$ rich gas streams containing $CO_2$ and CO. These and other embodiments of the present invention will become apparent upon a reading of the detailed description of the invention which follows.

DETAILED DESCRIPTION OF THE INVENTION

The compositions of the present invention comprise a hydrophilic polymer and at least one salt of an aminoacid, the salt of an aminoacid being present in an amount ranging from about 10 to about 80 wt % based on the total weight of the composition and preferably about 40 to about 65 wt %.

The hydrophilic polymer suitable in the practice of the present invention includes polyvinylalcohol, polyvinylacetate, polyvinyl pyrrolidone, polyethylene oxide, polyacrylamide, blends and copolymers thereof. In general these polymers will have weight average molecular weights in the range of about 30,000 to 2,000,000 and preferably in the range from about 50,000 to 200,000. Particularly preferred polymers useful in the present invention are polyvinylalcohols having molecular weights in the range from about 50,000 to 150,000.

The aminoacid salts in the compositions of the present invention are selected from salts having the formula:

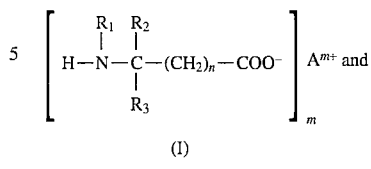

(I)

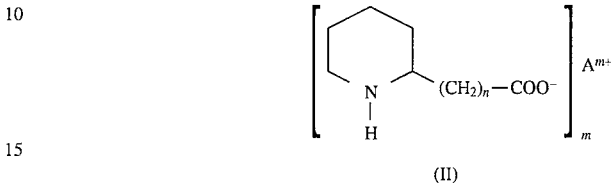

(II)

wherein $R_1$, $R_2$ and $R_3$ are hydrogen or alkyl groups having from 1 to 4 carbon atoms, n is an integer ranging from 0 to 4, $A^{m+}$ is cation having a valence of 1 to 3 and selected from metals and an amine cation having the formula:

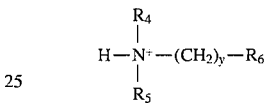

wherein $R_4$ and $R_5$ are hydrogen or alkyl groups having from 1 to 4 carbon atoms, $R_6$ is hydrogen, an alkyl group of from 1 to 4 carbon atoms or an alkyl amine of from 2 to 6 carbons and 1 to 4 nitrogen atoms, y is an integer ranging from 1 to 4, and m is an integer equal to the valence of the cation, $A^{m+}$. When $A^{m+}$ is a metal cation, preferably it is selected from metals of Groups Ia, IIa, IIIa (especially aluminum) and VIII (especially iron) of the Periodic Tables of the Elements. The Periodic Table referred to herein is that appearing in the inside cover of Lange's Handbook of Chemistry, 11th edition, McGraw-Hill Book Company (1973).

As previously stated, the amount of aminoacid salt to be present in the composition is in the range from about 10 to 80 wt % based on the total weight of the composition, and preferably about 40 to about 65 wt %.

The compositions of the present invention are prepared by first forming a solution of the polymer and the aminoacid salt in a suitable solvent such as water. Generally, the amount of water employed will be in the range from about 70% to 95%. The composition can then be recovered from the solution by removing the solvent, for example, by allowing the solvent to evaporate; however, it is preferred to use the solution in forming a non-porous membrane. Thus, the resulting solution is formed into a non-porous membrane by techniques well known in the art. For example, the polymer solution can be cast onto a solid support with techniques such as "knife casting" or "dip casting". Knife casting, of course, is a process in which a knife is used to draw a polymer solution across a flat surface to form a thin film of the polymer solution of uniform thickness after which the solvent of the polymer solution is evaporated, at ambient or temperatures up to about 100° C., to yield the fabricated membrane. When, for example, a glass plate is used as the flat surface, the membrane can then be removed from the support providing a free standing polymer membrane. When, alternatively, the flat surface used is a nonselective porous support such as porous polytetrafluoroethylene, the resulting membrane is a composite membrane comprising the selective membrane polymer and the support. Dip casting is the process in which the polymer solution is contacted with a non-selective porous support.

Then excess solution is permitted to drain from the support and the solvent of the polymer solution is evaporated, at ambient or elevated temperatures as above. The membrane comprises both the polymer and the porous support.

The membranes of the present invention also may be shaped in the form of hollow fibers, tubes, films, sheets and the like.

In an alternate embodiment of the present invention a cross-linking agent is added to the polymer and aminoacid solution before forming a membrane from it.

Suitable cross-linking agents include formaldehyde, divinyl sulfone, toluene diisocyanate, glyoxyal, trimethylol melamine, terephthalaldehyde, epichlorohydrin, vinyl acrylate and maleic anhydride. Formaldehyde, divinyl sulfone and toluene diisocyanate are particularly preferred.

The amount of cross-linking agent employed will be in the range of about 1 to about 20 wt % based on the total weight of the solid composition formed from the solution.

Membranes formed from the solution containing a cross-linking agent typically are heated at a temperature and for a time sufficient for cross-linking to occur. Generally, cross-linking temperatures in the range from about 80° C. to about 120° C. are employed. Cross-linking will occur in from about 1 to 72 hours.

As indicated previously, the compositions of the present invention are especially suitable for use as a non-porous membrane for separating $CO_2$ from $CO_2$ containing gas streams. Accordingly, $CO_2$ is removed from a gaseous feed stream by contacting the stream against one side, a first side, of the membrane and by withdrawing at the obverse or second side of the membrane a permeate comprising the $CO_2$. The permeate comprises the $CO_2$ in increased concentration relative to the feed stream. By "permeate" is meant that portion of the feed stream which is withdrawn at the second side of the membrane, exclusive of other fluids such as a sweep gas or liquid which may be present at the second side of the membrane.

The present invention will be better understood by reference to the following examples which are offered by way of illustration and not limitation.

EXAMPLES

In the examples which follow flux is expressed in units of $cm^3$ (STP)/($cm^2$.s), permeability is expressed in Barrer (Barrer=$10^{-10} cm^3$(STP).cm/($cm^2$.s.cm Hg) and the separation factor (selectivity) for $CO_2$ vs. $H_2$ is expressed as follows:

$$\text{Separation Factor} = \frac{CO_2/H_2 \text{ concentration ratio in the permeate}}{CO_2/H_2 \text{ concentration ratio in the retentate}}$$

The retentate refers to the mixture on the feed side of the membrane which is rejected by the membrane under the operating conditions. The flux is determined based on concentration measurements obtained by gas chromatography and permeate stream flow rate measurements by a flow meter. The relationship between flux and permeability is as follows:

$$\text{flux} = \text{permeability} (p_1-p_2)/L$$

where $p_1$ and $p_2$ are the $CO_2$ partial pressures in the retentate and permeate streams, respectively, and L is the membrane thickness. The partial pressures are determined based on concentration measurements by gas chromatography and total pressure measurements by pressure gauges.

Example 1

Synthesis of 50 wt % Glycine—K Salt and 50 wt % Polyvinylalcohol Membrane

To about 18 g of water was added 3.329 g pf polyvinylalcohol (PVA) with stirring and heating at about 75° C. until a clear solution of the polymer was obtained. To this solution were added 16 g of water and 2.192 g of glycine with stirring. Then, 1.646 g of KOH in 3 g of water was added slowly to the PVA/glycine solution with stirring for about 20 minutes to obtain a clear, homogeneous solution. The solution was then centrifuged for about 5 minutes. Following centrifugation a membrane was knife-cast with a gap setting of 8 mils onto a support of microporous polytetrafluoroethylene. Water was allowed to evaporate from the membrane in a nitrogen box at ambient conditions over a period of about 17 hours. The membrane was then heated in an oven at 90° C. for about 5 hours. The resulting membrane comprised about 50 wt % glycine—K salt and 50 wt % polyvinylalcohol on a microporous polytetrafluoroethylene support and had a thickness of 19.7 microns (exclusive of the support).

Example 2

Synthesis of 60 wt % Glycine—Li Salt and 40 wt % Polyvinylalcohol Membrane

To a solution of 4.008 g polyvinylalcohol (PVA) in 21.852 g water were added 20 g water and 5.556 g glycine at about 70° C. with stirring for about 1 hour to obtain a clear solution. To the PVA/glycine solution were added 3.113 g LiOH.$H_2$O and 10 g water also at about 70° C. with stirring for about 1 hour to obtain a clear, homogeneous solution. The solution was then centrifuged for about 30 minutes. Following centrifugation a membrane was knife-cast with a gap setting of 6 mils onto a support of microporous polytetrafluoroethylene. Water was allowed to evaporate from the membrane for over a weekend in a nitrogen box under ambient conditions. The membrane was then heated in an oven at about 90° C. for about 8 hours. The resulting membrane comprised 60 wt % glycine—Li salt and 40 wt % polyvinylalcohol on the microporous polytetrafluoroethylene support, and had a thickness of 19.2 microns (exclusive of the support).

Example 3

Synthesis of 40.3 wt % Pipecolinic Acid—K Salt, 44.6 wt % Polyvinylalcohol and 15.1 wt % Formaldehyde Membrane To a solution of 4.191 g polyvinylalcohol (PVA) in 22.849 g water was added 3.830 g of a solution of 37 wt % formaldehyde in water, i.e., 1.417 g formaldehyde and 2.413 g water, at about 70° C. with stirring for about 10 minutes. To the PVA/formaldehyde solution was added 6.185 g of 4M pipecolinic acid—K salt solution, i.e., 3.786 g pipecolinic acid—K salt and 2.399 g water, with stirring for about 10 minutes to obtain a clear, homogeneous solution. The solution was then centrifuged for about 5 minutes. Then, a membrane was knife-cast with a gap setting of 5 mils onto a support of microporous polytetrafluoroethylene. Water was allowed to evaporate in a nitrogen box at ambient conditions for about 1 day. The membrane was then heated at 110° C. for about 18 hours. The resulting membrane comprised 40.3 wt % pipecolinic acid—K salt, 44.6 wt % polyvinylalcohol and 15.1 wt % formaldehyde residue on the microporous polytetrafluoroethylene support, and had a thickness of 17.2 microns (exclusive of the support).

Example 4

Synthesis of 50 wt % Pipecolinic Acid—K Salt, 37.3 wt % Polyvinylalcohol and 12.7 wt % Formaldehyde Membrane To a solution of 4.489 g polyvinylalcohol (PVA) in 24.471 g water was added 4.125 g of a solution of 37 wt % formaldehyde in water, i.e., 1.526 g formaldehyde and 2.599 g water, at about 70° C. with stirring. To the PVA/formaldehyde solution were added 22 g water, 4.635 g pipecolinic acid, and a solution of 2.014 g KOH in 6 g water with stirring for about 5 minutes. The solution was then centrifuged for about 50 minutes. Then, a membrane was knife-cast with a gap setting of 6 mils onto a support of microporous polytetrafluoroethylene. Water was allowed to evaporate in a nitrogen box at ambient conditions for about 1 day. The membrane was then heated in an oven at about 110° C. for about 17 hours. The resulting membrane comprised 50 wt % pipecolinic acid—K salt, 37.3 wt % polyvinylalcohol and 12.7 wt % formaldehyde residue on the microporous polytetrafluoroethylene support, and had a thickness of 29.8 microns (exclusive of the support).

Example 5

Synthesis of 50 wt % Glycine—Ethylenediamine Salt and 50 wt % Polyvinylalcohol Membrane To 1.334 g (0.0222 mole) ethylenediamine (EDA) was added a stoichiometric amount of 1.666 g (0.0222 mole) glycine with stirring to make the glycine-EDA salt. To this salt was added 5 g water with stirring. The aqueous solution of glycine-EDA salt and 1 g water were added to a solution of 3.000 g polyvinylalcohol in 16.410 g water at about 70° C. with stirring for about 20 minutes to obtain a clear, homogeneous solution. The solution was then centrifuged for about 20 minutes. After centrifugation, a membrane was knife-cast with a gap setting of 8 mils onto a support of microporous polytetrafluoroethylene. Water was allowed to evaporate from the membrane for about 17 hours in a nitrogen box under ambient conditions. The membrane was then heated in an oven at 90° C. for 4 hours. The resulting membrane comprised 50 wt % glycine—EDA salt and 50 wt % polyvinylalcohol on the microporous polytetrafluoroethylene support, and had a thickness of 24.8 microns (exclusive of the support).

Example 6

Synthesis of 50 wt % Aminoisobutyric Acid—Ethylenediamine Salt and 50 wt % Polyvinylalcohol Membrane To 1.105 g (0.01838 mole) ethylenediamine (EDA) were added a stoichiometric amount of 1.895 g (0.01838 mole) aminoisobutyric acid (AIBA) and 10 g water with stirring to make the aqueous solution of AIBA-EDA salt. This solution was added to a solution of 3.000 g polyvinylalcohol in 16.410 g water at about 70° C. with stirring for 20 minutes to obtain a clear, homogeneous solution. The solution was then centrifuged for about 30 minutes. Then, a membrane was knife-cast with a gap setting of 8 mils onto a support of microporous polytetrafluoroethylene. Water was allowed to evaporate in a nitrogen box overnight at ambient conditions. The membrane was then heated at 90° C. for 4 hours. The resulting membrane comprised 50 wt % AIBA-EDA salt and 50 wt % polyvinylalcohol on the microporous polytetrafluoroethylene support, and had a thickness of 25.9 microns (exclusive of the support).

Example 7

Permeation Measurements of Membrane of Example 1

In the permeation measurement to evaluate flux, permeability and the separation factor (selectivity) of $CO_2$ vs. $H_2$, the membrane was placed in a permeation cell comprising the first compartment for contacting a feed stream against the upstream side of the membrane and the second compartment for withdrawing the permeate from the downstream side of the membrane. The active membrane area in the cell was 63.62 cm². A feed gas comprising 75% $H_2$ and 25% $CO_2$ under a total pressure of about 3 atm at about ambient temperature (23° C.) was contacted against the membrane at a flow rate of about 120 cm³/min. The permeate was swept by nitrogen under a pressure of about 1 atm and a total flow rate of 10–50 cm³/min for the permeate/nitrogen stream. Both the feed and sweep streams were humidified by bubbling through deionized water prior to contacting the membrane.

For the membrane of Example 1 comprising 50 wt % glycine—K salt and 50 wt % polyvinylalcohol with a total flow rate of 10.6 cm³/min for the permeate/sweep stream, the $CO_2$ flux result obtained was $3.72 \times 10^{-4}$ cm³ (STP)/(cm².s), the $CO_2$ permeability was 161 Barrers, and the $CO_2/H_2$ selectivity was 15.2. When the total flow rate of the permeate/sweep stream was increased to 50.8 cm³/min for this membrane, the flux was increased to $5.16 \times 10^{-4}$ cm³ (STP)/(cm².s), the $CO_2$ permeability was 192 Barrers, and the $CO_2/H_2$ selectivity was increased to 16.6. The flux and selectivity increases were due to lower $CO_2$ partial pressure in the permeate side. The selectivity at a very low $CO_2$ partial pressure in the permeate, i.e., zero atm, may be estimated by multiplication of the selectivity obtained at a given partial pressure of $CO_2$, $P_2$, in the permeate by a factor of $p_1/(p_1-p_2)$, where $p_1$ is the partial pressure of $CO_2$ in the retentate. Thus, the selectivities at $p_2=0$ atm are estimated to be 18.9 for the total permeate/sweep rate of 10.6 cm³/min and 17.8 for the total rate of 50.8 cm³/min.

Example 8

Permeation Measurement of Membrane of Example 2

The membrane of Example 2 comprising 60 wt % glycine—Li salt and 40 wt % polyvinylalcohol was evaluated with a total permeate/sweep flow rate of 12.4 cm³/min in the same way described in Example 7. The $CO_2$ flux obtained was $4.75 \times 10^{-4}$ cm³ (STP)/(cm².s), the $CO_2$ permeability was 206 Barrers, and the $CO_2/H_2$ selectivity was 18. The selectivity at a $CO_2$ permeate pressure of zero is estimated to be 23.

Example 9

Permeation Measurement of Membrane of Example 3

The membrane of Example 3 comprising 40.3 wt % pipecolinic acid—K salt, 44.6 wt % polyvinylalcohol, and 15.1 wt % formaldehyde was evaluate with a total permeate/ sweep flow rate of 10 cm³/min in the same way described in Example 7. The $CO_2$ flux obtained was $0.83\times10^{-4}$ cm³ (STP)/(cm².s), the $CO_2$ permeability was 26 Barrers, and the $CO_2/H_2$ selectivity was 11.3. The selectivity at a $CO_2$ permeate pressure of zero is estimated to be 11.9.

Example 10

Permeation Measurement of Membrane of Example 4

The membrane of Example 4 comprising 50 wt % pipecolinic acid—K salt, 37.3 wt % polyvinylalcohol, and 12.7 wt % formaldehyde was evaluated with a total permeate/sweep flow rate of 10.3 cm³/min in the same way described in Example 7. The $CO_2$ flux obtained was $1.65\times10^{-4}$ cm³ (STP)/(cm².s), the $CO_2$ permeability was 96 Barrers, and the $CO_2/H_2$ selectivity was 13.1. The selectivity at a $CO_2$ permeate pressure of zero is estimated to be 14.3.

This membrane had a similar composition and polyvinylalcohol/formaldehyde ratio as the membrane of Example 3 except the difference in the amount of pipecolinic acid—K salt. As indicated from the results of these membranes shown in Examples 9 and 10, increasing the concentration of the metal salt of aminoacid improves $CO_2$ permeability and $CO_2/H_2$ selectivity.

Example 11

Permeation Measurement of Membrane of Example 5

The membrane of Example 5 comprising 50 wt % glycine ethylenediamine salt and 50 wt % polyvinylalcohol was evaluated with a total permeate/sweep flow rate of 10.2 cm³/min in the same way described in Example 7. The $CO_2$ flux result obtained was $3.04\times10^{-4}$ cm³ (STP)/(cm².s), the $CO_2$ permeability was 161 Barrers, and the $CO_2/H_2$ selectivity was 26.1. When the total flow rate of the permeate/sweep stream was increased to 50.3 cm³/min for this membrane, the flux was increased to $4.55\times10^{-4}$ cm³ (STP)/(cm².s), the $CO_2$ permeability was 211 Barrers, and the $CO_2/H_2$ selectivity was increased to 30.3. The flux and selectivity increases were due to lower $CO_2$ partial pressure in the permeate side. The selectivities at a $CO_2$ partial pressure of zero in the permeate are estimated to be 31.4 for the total permeate/sweep rate of 10.2 cm³/min and 31.9 for the total rate of 50.3 cm³/min.

Example 12

Permeation Measurement of Membrane of Example 6

The membrane of Example 6 comprising 50 wt % aminoisobutyric acid—ethylenediamine salt and 50 wt % polyvinylalcohol was evaluated with a total permeate/sweep flow rate of 10.1 cm³/min in the same way described in Example 7. The $CO_2$ flux obtained was $1.34\times10^{-4}$ cm³ (STP)/(cm².s), the $CO_2$ permeability was 67 Barrers, and the $CO_2/H_2$ selectivity was 14.3. The selectivity at a $CO_2$ permeate pressure of zero is estimated to be 15.5

As shown in Examples 7–12, the membranes of this invention may be employed for removal of $CO_2$ from a gas mixture of 75% $H_2$ and 25% $CO_2$. This gas mixture simulates a typical reformate based on the relative ratio of $H_2$ and $CO_2$.

What is claimed is:

1. A composition comprising:

a hydrophylic polymer and at least one salt of an aminoacid, the salt of the aminoacid being present in an amount ranging from about 10 to about 80 wt % based on the total weight of the composition, wherein the aminoacid salt is selected from salts having the formula:

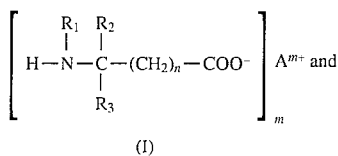

(I)

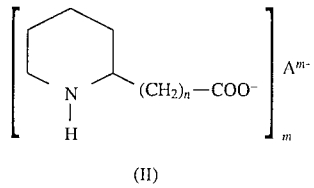

(II)

wherein $R_1$, $R_2$ and are hydrogen or alkyl groups having from 1 to 4 carbon atoms, n is an integer ranging from 0 to 4, $A^{m+}$ is a cation having a valence of 1 to 3 and selected from Groups Ia, IIa, and IIIa metals of the Periodic Table of Elements and an amine cation having the formula:

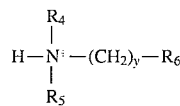

wherein $R_4$ and $R_5$ are hydrogen or alkyl groups having from 1 to 4 carbon atoms; $R_6$ is hydrogen, an alkyl group of from 1 to 4 carbon atoms or an alkyl amine of from 2 to 6 carbon atoms and 1 to 4 nitrogen atoms, y is an integer ranging from 1 to 4; and m is an integer equal to the valence of the cation.

2. The composition of claim 1 wherein the hydrophylic polymer is selected from the group consisting of polyvinylalcohol, polyvinylacetate, polyvinylpyrrolidone, polyethylene oxide, polyacrylamide, blends and copolymers thereof.

3. The composition of claim 2 wherein the polymer is polyvinylalcohol.

4. The composition of claim 2 including from about 1 to about 20 wt % of a cross-linking agent based on the total weight of composition.

5. The composition of claim 4 wherein the cross-linking agent is selected from the group consisting of formaldehyde, divinyl sulfone, toluene disocyanate, glyoxal, trimethylol melamine, terephthalaldehyde, epichlorohydrin, vinyl acryalte, and maleic anhydride.

6. The composition of claim 4 wherein the cross-linking agent is formaldehyde.

7. A nonporous membrane formed from the composition of claim 1, 2 or 5.

8. A process for separating $CO_2$ from a $CO_2$-containing gas stream comprising:

contacting a $CO_2$-containing gas stream with one side of a nonporous, $CO_2$ selectively permeable, membrane comprising a hydrophylic polymer and at least one salt of an aminoacid, the aminoacid being present in an amount ranging from about 10 to about 80 wt % based on the weight of the composition, wherein the aminoacid salt is selected from salts having the formula:

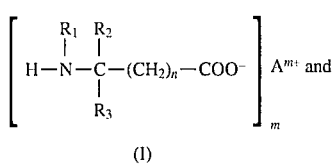

(I)

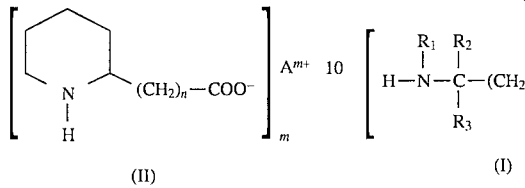

(II)

wherein $R_1$, $R_2$ and are hydrogen or alkyl groups having from 1 to 4 carbon atoms, n is an integer ranging from 0 to 4, $A^{m+}$ is a cation having a valence of 1 to 3 and selected from Groups Ia, IIa, and IIIa metals of the Periodic Table of Elements and an amine cation having the formula:

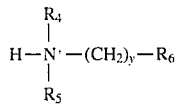

wherein $R_4$ and $R_5$ are hydrogen or alkyl groups having from 1 to 4 carbon atoms; $R_6$ is hydrogen, an alkyl group of from 1 to 4 carbon atoms or an alkyl amine of from 2 to 6 carbon atoms and 1 to 4 nitrogen atoms, y is an integer ranging from 1 to 4; and m is an integer equal to the valence of the cation, whereby $CO_2$ is selectively transported through the membrane; and, withdrawing from the obverse side of the membrane a permeate containing $CO_2$ whereby $CO_2$ is selectively removed from the gaseous stream.

9. A method for producing a nonporous membrane having properties sufficient to enable separation of $CO_2$ from a gaseous stream containing $CO_2$, the method comprising:

forming a casting solution of a solvent, a hydrophylic polymer and at least one salt of an aminoacid, the salt being present in an amount ranging from about 10 to about 80 wt % based on the total weight of polymer and salt;

casting the solution on a substrate; and evaporating the solvent whereby a nonporous membrane is formed.

10. The method of claim 9 wherein the salt is selected from salts having the formula

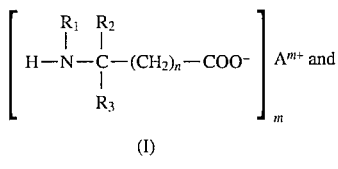

(I)

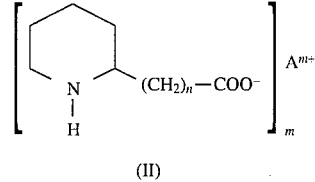

(II)

wherein $R_1$, $R_2$ and $R_3$ are hydrogen or alkyl groups having from 1 to 4 carbon atoms, n is an integer ranging from 0 to 4, $A^{m+}$ is a cation having a valence of from 1 to 3 and selected from metals and an amine cation having the formula:

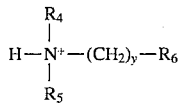

wherein $R_4$ and $R_5$ are hydrogen or alkyl groups having from 1 to 4 carbon atoms; $R_6$ is hydrogen, an alkyl group of from 1 to 4 carbon atoms or an alkyl amine of from 2 to 6 carbon and 1 to 4 nitrogen atom, y is an integer ranging from 1 to 4; and m is an integer equal to the valence of the cation.

11. The method of claim 10 including adding a crosslinking agent to the polymer solution.

* * * * *